US 9,218,822 B1

(12) United States Patent
Contreras et al.

(10) Patent No.: US 9,218,822 B1
(45) Date of Patent: Dec. 22, 2015

(54) DISK DRIVE WITH PREAMPLIFIER WITH ISOLATION FOR MULTIPLE READERS IN A SLIDER WITH A COMMON RETURN SIGNAL

(71) Applicant: HGST Netherlands B.V., Amsterdam (NL)

(72) Inventors: John Contreras, Palo Alto, CA (US); Samir Y. Garzon, San Jose, CA (US); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/711,428

(22) Filed: May 13, 2015

(51) Int. Cl.
*G11B 5/02* (2006.01)
*G11B 5/40* (2006.01)
*G11B 5/012* (2006.01)
G11B 27/36 (2006.01)
G11B 5/00 (2006.01)

(52) U.S. Cl.
CPC *G11B 5/02* (2013.01); *G11B 5/012* (2013.01); *G11B 5/40* (2013.01); *G11B 27/36* (2013.01); *G11B 2005/0016* (2013.01)

(58) Field of Classification Search
CPC .......... G11B 5/02; G11B 5/012; G11B 27/36; G11B 5/40; G11B 20/10009; G11B 2005/0016
USPC .................................. 360/234.5, 245.9, 264.2
See application file for complete search history.

(56) References Cited

U.S. PATENT DOCUMENTS

| 3,979,775 | A | | 9/1976 | Schwarz |
| 4,706,138 | A | | 11/1987 | Jove et al. |
| 5,323,278 | A | | 6/1994 | Contreras et al. |
| 5,331,478 | A | | 7/1994 | Aranovsky |
| 5,378,885 | A | | 1/1995 | Jones, Jr. et al. |
| 5,770,968 | A | | 6/1998 | Cameron |
| 5,796,552 | A | | 8/1998 | Akin, Jr. et al. |
| 5,859,564 | A | | 1/1999 | Sonntag et al. |
| 5,930,072 | A | | 7/1999 | Shrinkle |
| 6,060,872 | A | * | 5/2000 | Ranmuthu ............... 323/316 |
| 6,088,235 | A | | 7/2000 | Chiao et al. |
| 6,265,905 | B1 | | 7/2001 | Jove et al. |
| 6,288,863 | B1 | * | 9/2001 | Flinsbaugh ............... 360/66 |
| 6,404,579 | B1 | * | 6/2002 | Ranmuthu et al. ......... 360/66 |
| 6,420,910 | B1 | * | 7/2002 | Contreras et al. .......... 327/77 |
| 6,608,736 | B1 | * | 8/2003 | Klaassen et al. .......... 360/246 |
| 6,631,052 | B1 | | 10/2003 | Girard et al. |
| 6,700,719 | B2 | * | 3/2004 | Iroaga et al. ............... 360/46 |
| 7,023,647 | B2 | * | 4/2006 | Bloodworth et al. ...... 360/75 |
| 7,061,321 | B1 | | 6/2006 | Stein et al. |
| 7,283,331 | B2 | * | 10/2007 | Oh et al. ................. 360/245.1 |
| 7,505,229 | B1 | * | 3/2009 | Wallash ................... 360/245.9 |

(Continued)

*Primary Examiner* — Brian Miller
(74) *Attorney, Agent, or Firm* — G. Marlin Knight

(57) ABSTRACT

Interconnect and preamplifier designs are described for use in a disk drive with a common signal return lead system that interconnects a plurality of read transducers (readers) in a slider through the suspension to the preamplifier mounted on the actuator. Preamplifier embodiments have an isolated differential amplifier for each of the plurality of readers in the slider. The set of signal traces in the suspension include a common signal return lead for the plurality of readers in the slider. A preamplifier circuit design according to an embodiment of the invention includes isolated amplifiers for each reader with a separate bias source and power supply isolation elements for both power supply polarities for reduced crosstalk signal and noise between amplifiers.

13 Claims, 7 Drawing Sheets

(56) References Cited

U.S. PATENT DOCUMENTS

| | | |
|---|---|---|
| 7,525,768 B2 | 4/2009 | Wu et al. |
| 7,600,310 B2 | 10/2009 | Ho et al. |
| 7,643,250 B2 | 1/2010 | Araki et al. |
| 7,649,330 B2 * | 1/2010 | Yamashita et al. ............ 318/560 |
| 7,929,248 B2 | 4/2011 | Zhu et al. |
| 7,952,833 B2 | 5/2011 | Smith |
| 8,094,413 B1 | 1/2012 | Hentges et al. |
| 8,154,827 B2 | 4/2012 | Contreras et al. |
| 8,174,793 B2 | 5/2012 | Hasegawa et al. |
| 8,232,788 B2 * | 7/2012 | Boling et al. ................. 323/284 |
| 8,233,240 B2 | 7/2012 | Contreras et al. |
| 8,295,011 B2 | 10/2012 | Chou et al. |
| 8,422,172 B1 * | 4/2013 | Dakroub et al. ........... 360/245.9 |
| 8,514,506 B1 | 8/2013 | Li et al. |
| 8,988,829 B1 * | 3/2015 | Contreras et al. .......... 360/234.5 |
| 2008/0239588 A1 * | 10/2008 | Takashita et al. .......... 360/324.1 |
| 2009/0207529 A1 * | 8/2009 | Yao ............................ 360/245.9 |
| 2013/0286502 A1 | 10/2013 | Erden et al. |
| 2014/0160590 A1 | 6/2014 | Sankaranarayanan et al. |
| 2014/0329339 A1 * | 11/2014 | Chaji et al. ..................... 438/10 |

\* cited by examiner

DISK DRIVE WITH PREAMPLIFIER WITH ISOLATION FOR MULTIPLE READERS IN A SLIDER WITH A COMMON RETURN SIGNAL

RELATED APPLICATIONS

A related application is titled DISK DRIVE WITH PREAMPLIFIER FOR MULTIPLE READERS IN A SLIDER WITH A COMMON RETURN SIGNAL filed Sep. 18, 2014, bearing Ser. No. 14/489,477, which issued as U.S. Pat. No. 8,988,829 on Mar. 24, 2015.

A related application is titled INTEGRATED LEAD SUSPENSION (ILS) FOR TWO-DIMENSIONAL MAGNETIC RECORDING (TDMR) DISK DRIVE filed Jul. 25, 2014, bearing Ser. No. 14/340,690.

FIELD OF THE INVENTION

The present invention relates to the field of magnetic disk drive design and more particularly to the design and interconnection of sliders, suspensions for sliders and signal amplifiers and more particularly to the design and interconnection of such components in a system having a plurality of read elements in a slider that will be interchangeably referred to as transducers, sensors, heads or readers.

BACKGROUND

FIG. 1 is an illustration of selected components of a disk drive 10 according to the prior art. The disk drive includes at least one magnetic recording disk 12 that rotates on spindle 13 in direction 15 driven by a spindle motor (not shown). Housing or baseplate 16 provides support for the components. The upper portion of the outer protective case, which is present for normal operation, is removed for this illustration. The data is recorded in concentric or spiral data tracks 26 that are generally circular. Only a small sample of the many tracks are shown. In practice there are thousands of tracks that extend 360 degrees around the disk. The disk drive includes actuator 14 that pivots on pivot point 17 driven by a rotary voice coil motor (VCM) (not shown). The actuator 14 includes a rigid actuator arm 18. A flexible wiring cable 24, which is usually called the "flex cable," connects the devices on the actuator including read and write heads (not shown) in the slider 22 and the read/write integrated circuit chip (R/W IC) 21 shown) to the drive's system electronics (not shown). The R/W IC 21, which is interchangeably called the arm electronics chip or preamplifier chip, is typically mounted on the actuator arm as shown or integrated into the flex cable. A suspension 20, which is attached to the end of arm 18, includes a flexure/gimbal element (not shown) on which the air-bearing slider 22 is mounted to allow flexible movement during operation. As the disk 12 rotates, the slider with read/write heads is selectively positioned over a track to read and write the magnetic transitions. Disk drives often have more than one disk mounted on the spindle and the upper and lower surfaces of each disk can have magnetic recording material thereon, and the actuators with components mounted thereon are replicated as needed to access each of the recording surfaces.

The flex cable 24 provides electrical connections between the actuators and the system electronics on a circuit board (not shown). The flex cable 24 is rigidly attached by stationary bracket 23 at one end, which connects to the system electronics. The other end of the flex cable is attached to the set of actuators 14 which move in unison in response to the VCM.

A plurality of electrical paths (not shown) extend from the flex cable along the actuators to the arm electronics chip 21. The arm electronics chip is in turn connected by a plurality of electrical paths that extend through the suspension 20 and connect to the slider 22 as further illustrated in FIG. 2A. These electrical paths are typically called traces 31 and are made of copper. The load beam structure of the suspension is a spring metal layer, which is typically stainless steel. The tail end of the suspension has a set of tail termination pads 33 for electrical connection to the corresponding traces 31. The traces carry the signals for the readers (read heads), writer (write head) in the slider, as well as any additional signals required for fly height control by heater protrusion actuation, etc. The example suspension in FIG. 2A has eight termination pads that provide connection to eight slider connection pads 35 that are in turn connected to the slider (not shown) at the slider (or head) end 20H of the suspension. Differing numbers of pads and corresponding traces are common. The traces can vary in width and additional structures/features can be included in the paths to control electrical parameters such as impedance. Dielectric material separates the traces from the spring metal layer and a covering layer dielectric material is typically deposited over the traces. Subtractive and/or additive photolithography, deposition and etching processes can be used to manufacture suspensions and form the traces.

Typically the stainless steel spring metal layer in the suspension has been used as a ground plane for the traces. Because of the spatial constraints imposed on the suspension a multi-layer or stacked trace configurations have been used. Klaassen, et al. in U.S. Pat. No. 6,608,736 disclose stacked read signal traces arranged on top of each other and separated from each other by a dielectric layer and separated from the stainless steel base layer by another dielectric layer.

U.S. Pat. No. 8,094,413 to Hentges, et al. (Jan. 10, 2012) describes a disk drive head/slider suspension flexure with stacked traces having differing configurations on the gimbal and beam regions. A head suspension is described that includes integrated lead suspension flexure having stacked traces that run along one side of the spring metal layer and multi-layer traces that run along the other side. The traces come together in the tail region of the suspension where the set termination pads provide electrical connection to the system. The head suspension component includes stacked traces having first and second traces in the first and second conductor layers, respectively. The stacked traces are used for the writer in an embodiment and the multilayer traces are used for the reader and fly height traces and include a ground layer.

U.S. Pat. No. 8,233,240 to Contreras, et al. Jul. 31, 2012 describes an integrated lead suspension (ILS) in a magnetic recording disk drive has the transmission line portion of the ILS between the flex cable termination pads at the tail and the gimbal area formed of multiple interconnected segments, each with its own characteristic impedance. At the interface between any two segments there is a change in the widths and in impedance of the electrically conductive traces of the transmission line. The number of segments and their characteristic impedance values are selected to produce the largest frequency bandwidth with a substantially flat group delay from the write driver to the write head.

FIG. 2B illustrates a reader MR sensor, such as a tunneling magnetoresistive (TMR) transducer 22R, that is included in a slider and the preamplifier 21R that is included in arm electronics chip 21. The electrical signals pass through the traces in the suspension 20 described above. The TMR transducer is supplied with a current bias which allow changes in the resistance to be reflected in the signal. The signal can be amplified by current-sensing or voltage-sensing amplifier with a single-ended or differential input signal. The bias generator and the amplifier are typically combined and referred to as the preamp and included in the integrated circuit. The processed amplified signal is then sent to the system electronics through the flex cable either as a single-ended or differential signal.

U.S. Pat. No. 4,706,138 to Jove, et al. (Nov. 10, 1987) describes an transimpedance amplifier is used for biasing and amplifying the signals produced by an TMR transducer or MR (w/o tunnel effect). Electrically, the resistance, $R_h$, of the TMR sensor is disposed as degenerative feedback in the emitter circuit of a differential pair comprising the input stage of the amplifier. In this circuit configuration, a signal representing $\Delta R_h/R_h$ is sensed and amplified as a current through the TMR sensor. Bias current for the TMR sensor is supplied by the same constant current source that supplies current to both transistors comprising the input stage of the amplifier. To correct for direct current (DC) offset arising from variations in input stage transistor characteristics and the steady-state value of $R_h$, DC feedback to the input stage, via a level shift and amplifying stage, balances current flow in both paths of the differential input stage.

As areal densities continue to increase, recording schemes using more than one read transducer (reader) in each slider are being explored since having multiple readers allows higher density recording. FIG. 3 is an illustration of a section view (in parallel with the air-bearing surface) of a selected components of a prior art slider 22 with multiple read transducers/sensors R1 ... Rx. As shown each read transducer is flanked by a pair of shields S2 and S1. There is significant physical separation between the transducer, which leads to skew in relation to the tracks on the disk.

For Multiple Input Multiple Output (MIMO), also called Two Dimensional Magnetic Recording (TDMR), there are two or more magneto-resistive read transducers. Problem areas in front-end system design for multiple-reader architectures include: 1) slider design; 2) suspension interconnection lines, and 3) multiple reader preamplifier design. Each TMR transducer normally requires two electrical differential lines (wires) from the slider to the preamplifier. There is limited room for these electrical paths between the slider and the preamplifier. Each trace path has a design/engineering cost associated with it.

For the present disclosure, a three-reader (3R) architecture configuration and an independent differential amplifier (IDA) is assumed as the current state of the art. A 3R slider design using IDAs requires six connection pads (R1, −R1, R2, −R2, R3, & −R3) on the surface of the slider, which will consume much of the available external area on the slider and slider pads for electrical connections.

In addition, having three separate independent readers requires additional space between read transducers inside the slider. Having additional distance between read transducers creates skew problems caused by physical distance between the transducers. The fly-height control between transducers also creates spacing control problems due to the additional distance between them. For the suspension interconnection, having six conductive traces creates area issues in the layout, where the suspension's tail width space is limited. For the preamplifier, having IDAs requires additional IC area and power, which are key design constraints for the electronic packaging (flex area and mechanical connection to actuator).

For the above three segments of the front-end system, a design solution is needed to minimize the overall required area, power requirement with low electronic noise.

SUMMARY OF THE INVENTION

Embodiments of the invention include a preamplifier for use in a disk drive with a common signal return lead system that interconnects a plurality of read transducers (readers) in a slider through the suspension to the preamplifier mounted on the actuator. The common signal return lead system supplies a single-ended signal from each reader and allows for a substantial reduction in layout area for the interconnects in the slider, for the suspension, and in the preamplifier IC. In embodiments with three readers, for example, four signal traces (three dedicated and one common) are used to connect the set of three readers in the slider to the preamplifier.

Accordingly the preamplifier in embodiments of the invention has a single-ended input amplifier for each of the plurality of readers in the slider, but the output of the amplifiers is a differential signal that is transmitted upstream to the system electronics. The space constraints are sufficiently relaxed between the preamplifier and the system electronics to allow the benefits of the use of differential signals despite the additional wires that are required. In embodiments each amplifier is isolated from noise and crosstalk by being connected to a corresponding isolated voltage bias source and by inclusion of separate power supply isolation elements in the power supply voltage paths.

A preamplifier circuit design according to an embodiment of the invention includes a common-base amplifier (CBA) for each reader with a separate voltage bias source to reduce crosstalk and power supply isolation elements for both power supply polarities. The power supply isolation components reduce the crosstalk between amplifiers, which would otherwise be transmitted through the shared power supply lines. The power supply isolation elements are preferably integrated into the preamplifier integrated circuit chip that is mounted on the actuator. The two power supply polarities are generated in the system electronics and delivered to the preamplifier chip through the flex cable. Each CBA is connected to the common lead. The power supply isolation elements in an embodiment can be resistors with a relatively high resistance, e.g. 10 to 1000 ohms.

DETAILED DESCRIPTION OF THE EMBODIMENTS OF THE INVENTION

The common return signal lead connections of the slider, suspension, and preamplifier creates the common lead system, which allows for a substantial reduction in layout area for the interconnects in the slider, for the suspension, and in the preamplifier IC. Utilizing a common lead connection according to embodiments of the invention for the plurality of readers creates compact electrical connections between the preamplifier and the readers through the suspension. The suspension can then have a reduced or minimum number of signal traces. Therefore, a common-lead architecture readers (CLAR) system enables a compact system design of the readers, suspension, and preamplifier. The CLAR solution reduces the electrical traces/wiring for the three segments of the front-end system: 1) read transducers and slider, 2) suspension, and 3) a multiple reader preamplifier. The CLAR system reduces the I/O count which helps reduce the layout area for a more compact design of all three front-end segments. A common-lead (CL) connection in the slider enables a compact design of the readers.

Figure 8:
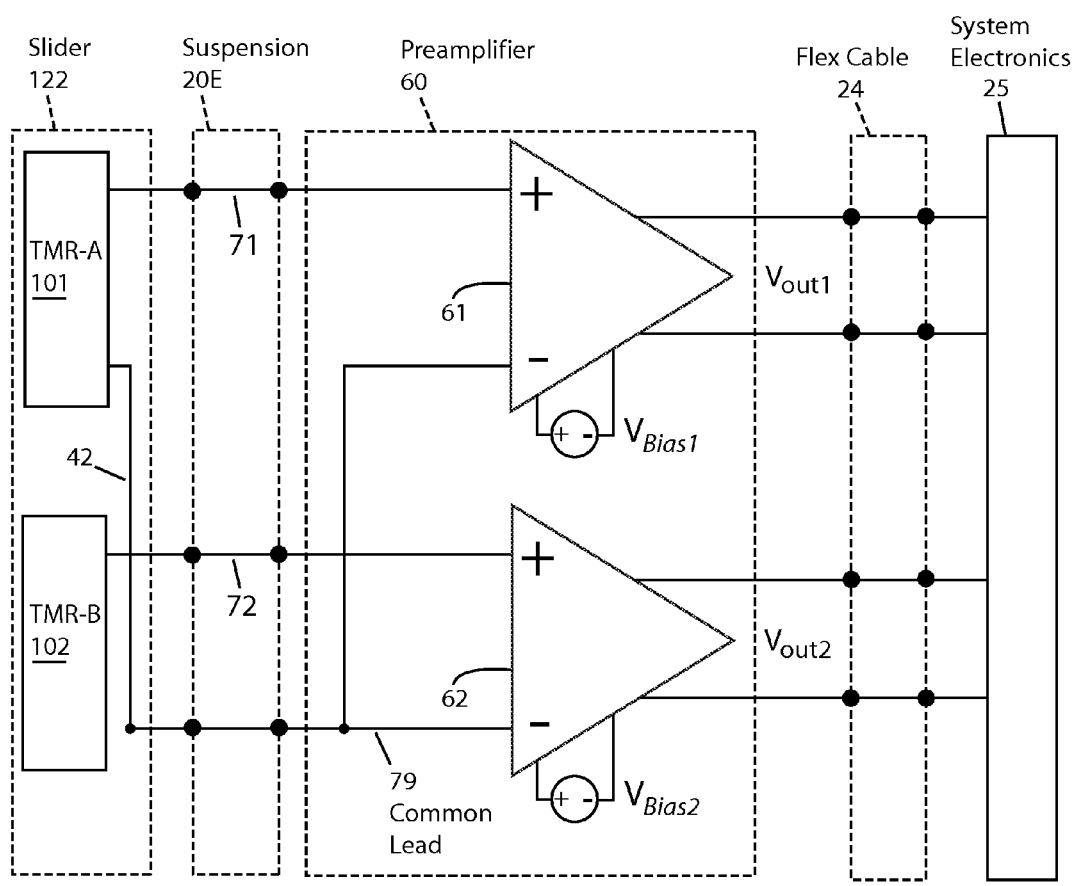
FIG. 8 is a block illustration of a preamplifier according to an embodiment of the invention with selected connections between a slider with multiple readers connected to a common return signal lead, suspension and the preamplifier with isolated differential amplifiers.

FIG. 8 is a block diagram illustrating an overview of the interconnections between a slider 122 with two readers (e.g. TMR transducers 101, 102), a suspension 20E and a preamplifier 60 using a common lead design according to an embodiment of the invention. Only two transducers are shown for simplicity, but embodiments of the invention with three or more transducers can be designed according to the principles described herein. TMR transducers 101, 102 are connected inside the slider to common lead 42, as illustrated in FIG. 4 and further discussed below.

Figure 1:
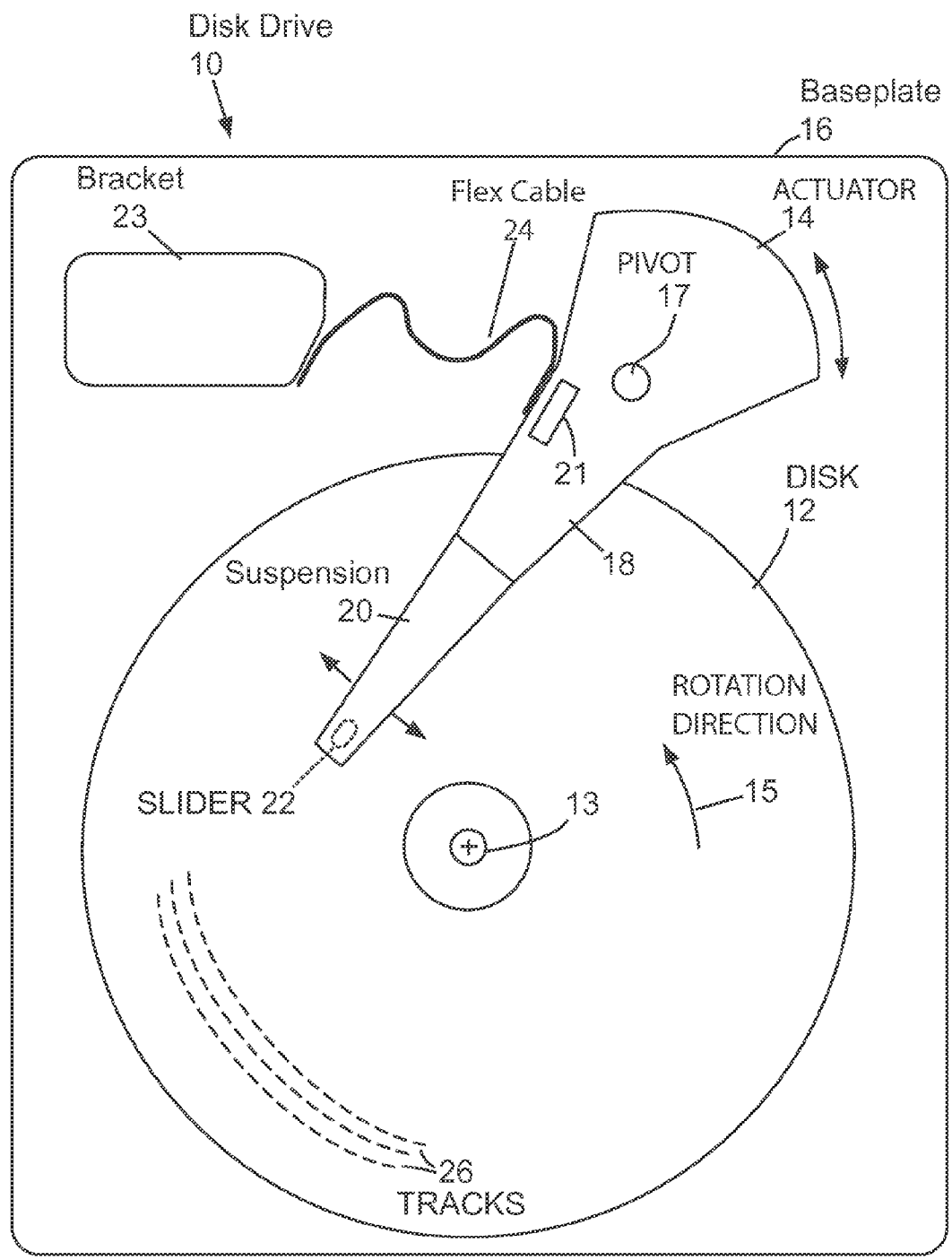
FIG. 1 is an illustration of selected components of a disk drive according to the prior art.
Figure 2A:
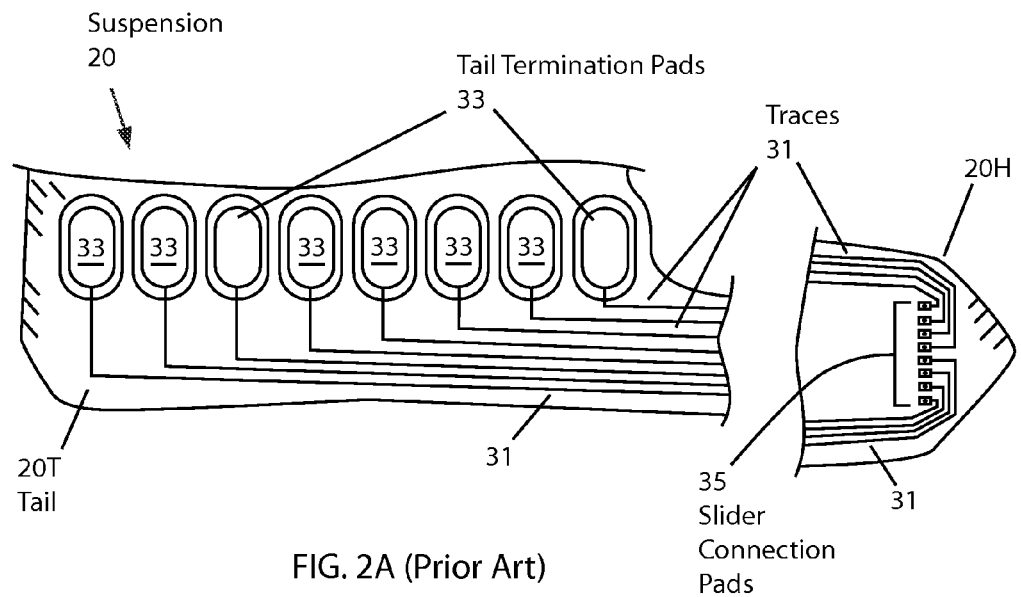
FIG. 2A is an illustration of a top view of selected components of a prior art suspension with electrically conductive traces.
Figure 2B:
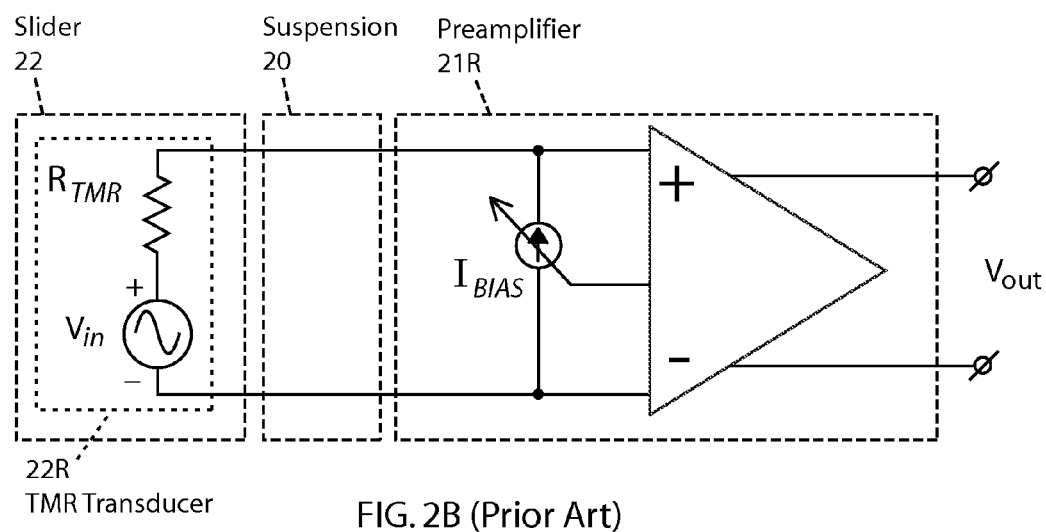
FIG. 2B is a block illustration connections between a read transducer and a preamplifier according to the prior art.

The preamplifier 60 can be implemented as part of a R/W IC 21 as illustrated in FIG. 1. The slider and preamplifier IC are both mounted on the drive's movable actuator (not shown). The preamplifier 60 includes isolated differential amplifiers 61, 62 embodiment according to the invention for each TMR transducer. Each differential amplifier has a separate voltage bias source $V_{Bias1}$, $V_{Bias2}$ for each transducer, which provides isolation and reduces crosstalk and noise coupling. The power supply isolation elements for both power supply polarities are not shown in FIG. 8, but are shown in FIGS. 9 and 10.

The signals for the readers are transmitted to preamplifier 60 through suspension 20E on electrically conductive traces 71, 72 and common return lead trace 79. The single-ended signals are processed through single-ended input amplifiers 61, 62 to generate corresponding differential output signals $V_{Out1}$, $V_{Out2}$, which are then transmitted through the flex cable 24 to the system electronics 25 in the disk drive for further processing according to prior art techniques. The differential amplifiers 61, 62 also supply bias current to the corresponding readers although this function is not illustrated in FIG. 8, but is illustrated in FIG. 10. The internals of embodiments of the preamplifier will be discussed further below.

Figure 9:
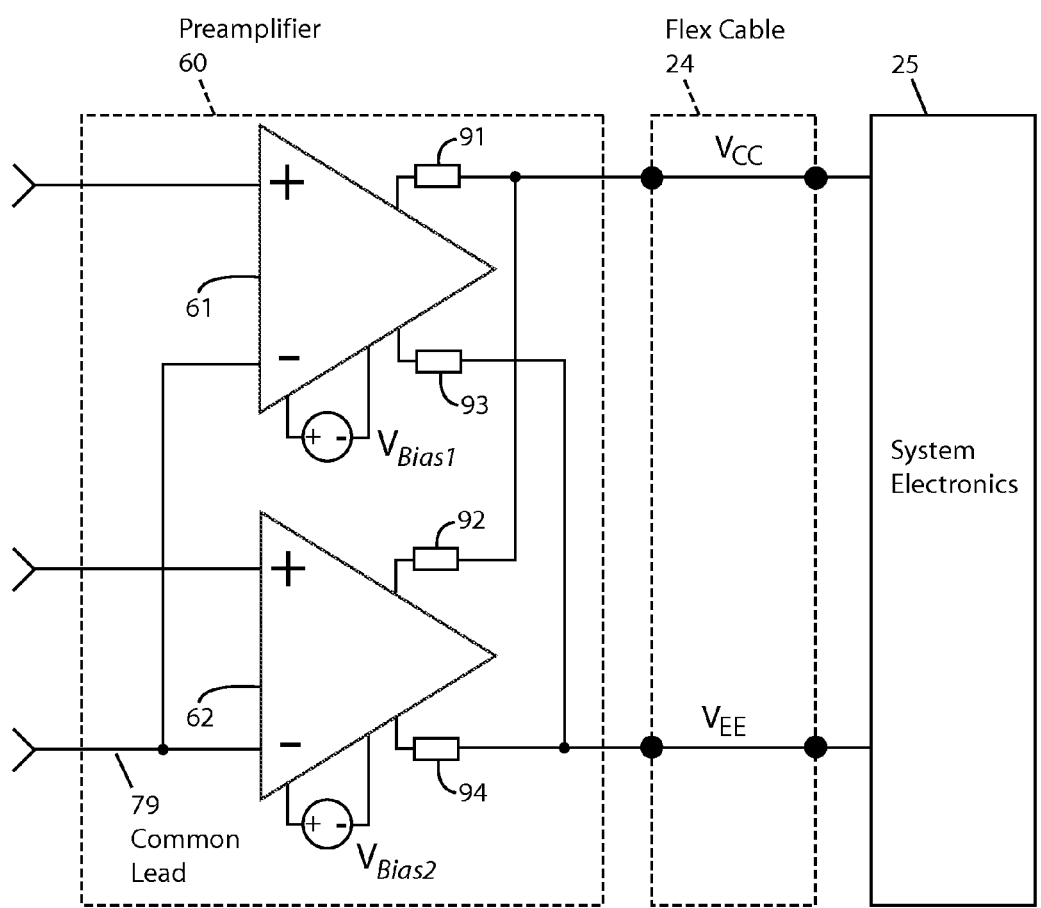
FIG. 9 is a block illustration of a preamplifier with isolated differential amplifiers according to an embodiment of the invention with selected connections through a flex cable for power supply to the preamplifier.

FIG. 9 is a block illustration of a preamplifier 60 according to an embodiment of the invention with selected connections through a flex cable 24 for power supply to the preamplifier. The plus and minus power supply voltages $V_{CC}$ and $V_{EE}$ are generated in system electronics 25, which are rigidly mounted in the disk drive and are connected to the movable actuator (not shown) through flex cable 24. The flex cable also carries the various read, write and control signals to and from the preamplifier, which is mounted on the movable actuator. Each amplifier 61, 62 has a power supply isolation component in series with the power supply leads. Thus amplifier 61 has component 91 in series with the $V_{CC}$ power supply line and has component 93 in series with the $V_{EE}$ power supply line. Amplifier 62 has component 92 in series with the $V_{CC}$ power supply line and has component 94 in series with the $V_{EE}$ power supply line. The power supply isolation components 91-94 can be resistive or inductive in embodiments of the invention. The power supply isolation components 91-94 reduce the crosstalk and noise between amplifiers 61, 62, which would otherwise be transmitted through the shared $V_{CC}$ and $V_{EE}$ power supply lines. The objective of the power supply isolation is to separate the amplifiers such that the signals and noise sources are not cross coupled between amplifiers.

Figure 10:
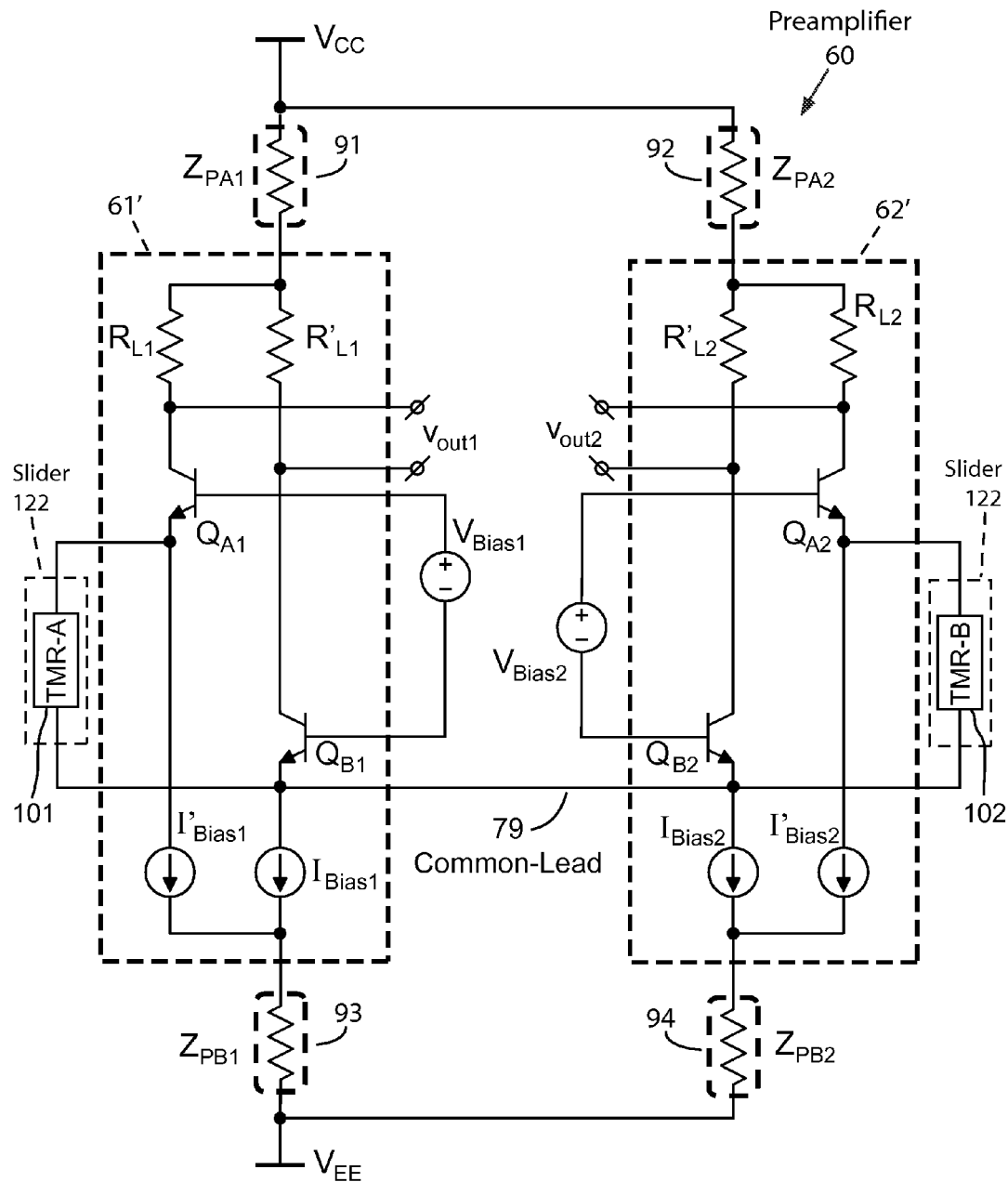
FIG. 10 is a circuit diagram illustrating selected components in a preamplifier circuit design for a two reader system with a common return signal lead according to an embodiment of the invention.

A circuit diagram for selected components of a preamplifier 60 according to an embodiment of the invention is shown in FIG. 10. With isolated differential amplifiers the cross coupling of signals and noise sources is not significantly affected by the connected common lead 79 and the input of each amplifier. The power supply isolation impedance elements in an embodiment can be resistors with a relatively high resistance, e.g. 10 to 1000 ohms. For signal transmission through suspension 20E, the input impedance of each isolated differential amplifier can be substantially equivalent to the transmission lines' characteristic impedance for wide bandwidth data transmission.

An implementation of isolated differential amplifiers 61', 62' is shown in FIG. 10. For this embodiment, a common-base amplifier (CBA) configuration is used. Each CBA has the same equivalent circuit design. CBA 61' includes transistors $Q_{A1}$ and $Q_{B1}$, which have their emitters connected to the leads for transducer 101. The lead connected to the emitter of $Q_{B1}$ is also the common signal return lead 79. The transducer's output signal is received through the lead connected to $Q_{A1}$. The current bias for the transducer is also supplied through the lead connected to $Q_{A1}$. The differential output signal $V_{Out1}$ is generated at the collectors of $Q_{A1}$ and $Q_{B1}$, which pull current through collector resistors $R_{L1}$, $R'_{L1}$ respectively. The collector resistors are both connected to $V_{CC}$ power supply isolation element 91, which is a resistor in this embodiment. The emitters of $Q_{A1}$ and $Q_{B1}$ are connected to current bias sources $I_{Bias1}$, $I'_{Bias1}$ respectively, which are both connected to $V_{EE}$ power supply isolation element 93, which is a resistor in this embodiment. The base of $Q_{A1}$ is connected to the positive output of voltage bias source $V_{Bias1}$, and the base of $Q_{B1}$ is connected to the negative output of $V_{Bias1}$. The design of amplifier 62' is the same as described above. Embodiments with additional amplifiers can be constructed in a straightforward way.

Slider and Suspension Trace Designs

Various embodiments of the slider and signal trace configurations on the suspension are described that can be used with the preamplifier design described above. The slider and suspensions in these examples each have three readers, but embodiments with two readers can be designed according to the described principles. In a single-layer embodiment, the common return lead is split into two traces on the suspension which are interleaved with the three dedicated signal traces for the three readers. In a dual-layer embodiment, the three dedicated signal traces are placed in one layer and common return lead is placed in a second layer. In one embodiment a shielding network of traces acts like a shield in a coaxial cable.

Figure 3:
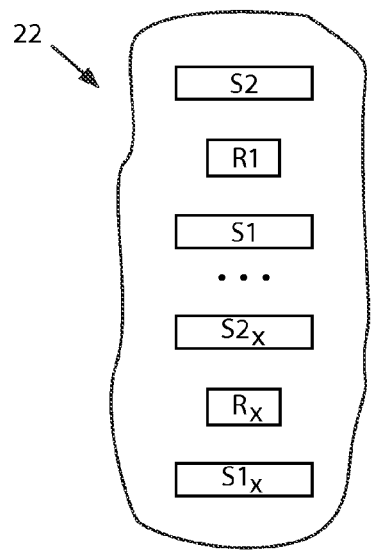
FIG. 3 is an illustration of a section view of selected components of a prior art slider with multiple read transducers.
Figure 4A:
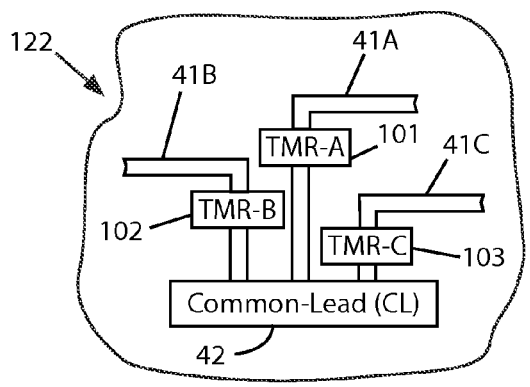
FIG. 4A is an illustration of the electrical connections in a slider according to an embodiment of the invention with three read transducers as viewed from the air-bearing surface.
Figure 4B:
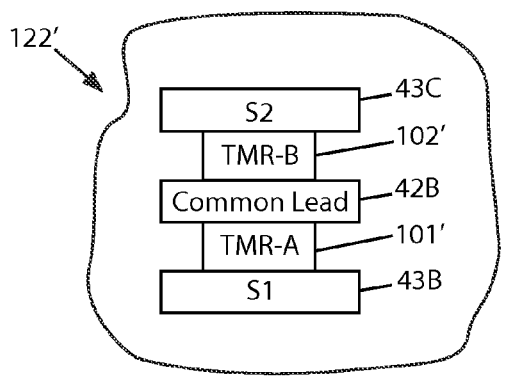
FIG. 4B is an illustration of alternative electrical connections in a slider according to an embodiment of the invention with two stacked read transducers as viewed from the air-bearing surface.

FIG. 4A is an illustration of the electrical connections in a slider 122 according to an embodiment of the invention with three TMR readers 101, 102, 103 as viewed parallel to the air-bearing surface (ABS). In contrast to the prior art arrangement shown in FIG. 3, the common lead design allows a compact arrangement of the readers in relation to the ABS and, therefore, the tracks on the disk. The common lead 42 also serves a shield for the readers. An additional shield (not shown) would be positioned above TMR-A 101 as shown on the page. The reader signals inside the slider are carried on the three conductive paths 41A, 41B, 41C, which along with common lead 42 are connected to pads on the exterior of slider 122, which are then connected to the traces in the suspension. FIG. 4B is an illustration of the electrical connections in slider 122', which is an alternative embodiment with a stackable two reader design, where a common lead isolated differential amplifier can also be applied. Here, the common lead 42B, is positioned between the two readers 101', 102' and between signal connection shield S1 43B, and shield S2 43C.

Figure 5:
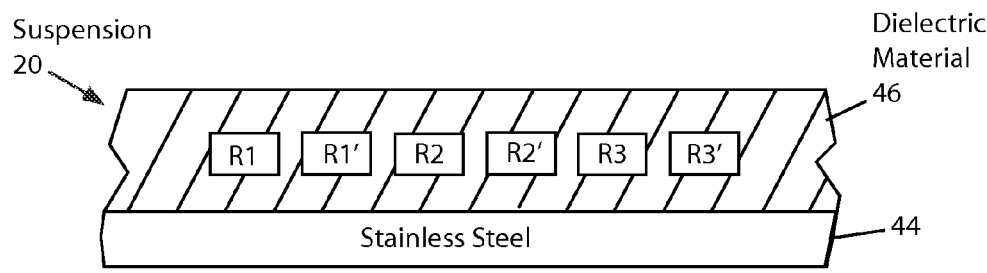
FIG. 5 is an illustration of a section view of selected components of a prior art suspension with traces for multiple read transducers.

FIG. 5 is an illustration of a section view of a selected components of a prior art suspension 20 with traces for three readers. For each reader there are two traces, e.g. R1 and R1', R2 and R2', R3 and R3'. Therefore, six traces are needed for the three readers. The stainless steel layer 44 is separated from the conductive material (typically copper) that forms the traces by dielectric material 46.

For a three reader (3R) system using the common lead (CL) design, the minimum total number of connection pads is 4 (R1, R2, R3, & Rg), where Rg is the CL connection. For the suspension interconnection, using a CL design allows for a reduction of leads in a 3R system, from 6 to 4 leads. This suspension interconnect can be a dual layer configuration or a coplanar configuration with interstitial return lines, which then allows for the reduction of lines from 6 to 5 lines. With both the dual-layer and coplanar suspension interconnect, the CL connection allows for a reduction of I/Os and area savings in the layout.

Figure 6A:
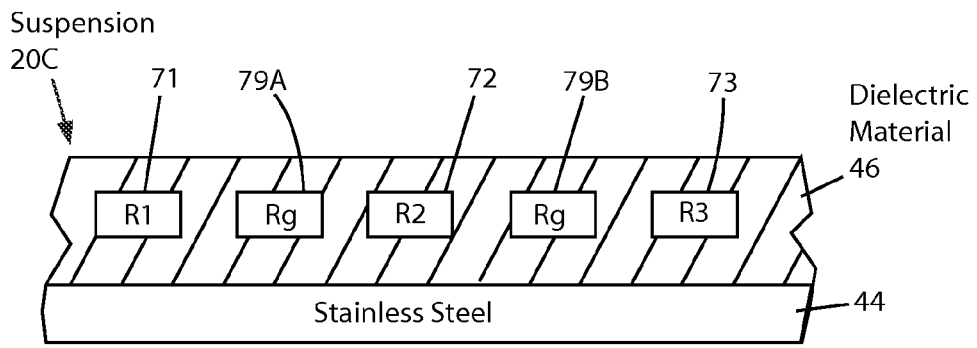
FIG. 6A is an illustration of a section view of selected components of a suspension according to an embodiment of the invention with single layer traces for multiple read transducers and a common return signal lead according to an embodiment of the invention.

FIG. 6A is an illustration of a section view of selected components of a suspension 20C according to an embodiment of the invention with a single layer of traces for multiple readers and a common lead. The view is at a point in the suspension between slider connection pads and the tail termination pads. This embodiment uses a coplanar configuration with interstitial return lines 79A, 79B, which are both connected to the common signal return, which then allows for the reduction of trace lines from 6 to 5 lines. The conductive material in the traces is separated by dielectric material 46, which also separates the traces from the stainless steel layer 44. In this embodiment each reader has a dedicated single trace. Accordingly the dedicated trace for the first reader is R1 71, for the second reader R2 72 and for the third reader R3 73. In this embodiment the shared common lead traces Rg are 79A, 79B. These two Rg traces are electrically connected/shorted at both ends of suspension, i.e. in the head and tail areas. The two Rg traces help create a noise resistant transmission line.

Figure 6B:
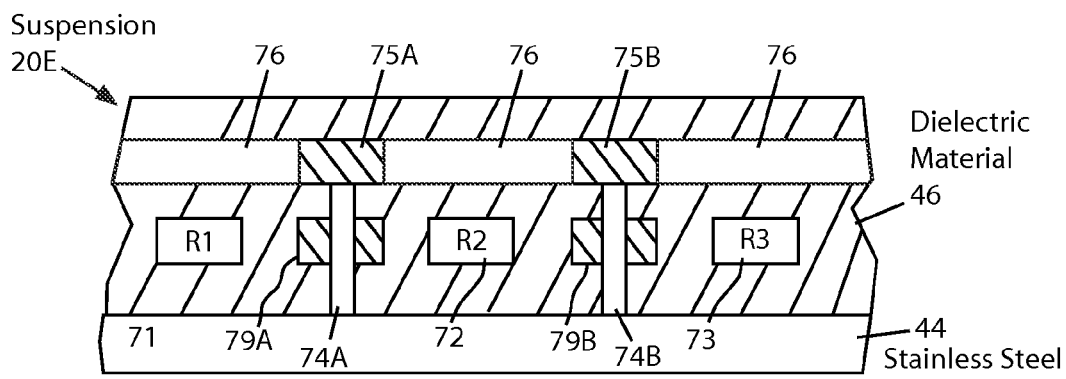
FIG. 6B is an illustration of a section view of selected components of a suspension according to an embodiment of the invention with dual layer traces with vias filled with conductive material connecting an upper network of traces with the common return signal lead for multiple read transducers according to an embodiment of the invention.
Figure 6C:
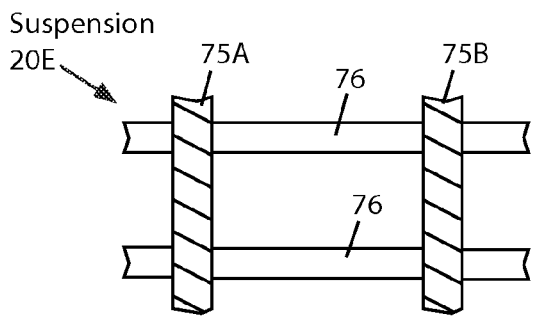
FIG. 6C is an illustration of a top view of selected components forming the shielding network of traces in a suspension shown in FIG. 6B.

FIG. 6B is an illustration of a section view of a selected components of a suspension 20E according to an embodiment of the invention with dual layer traces with vias 74A, 74B filled with conductive material connecting an upper network of traces 75A, 75B, 76 with the common lead for multiple read heads according to an embodiment of the invention. The first layer of traces in this embodiment is similar to the one shown in FIG. 6A, but an additional upper layer of conductive traces is formed that includes 75A, 75B which extend into and out of the page as shown in parallel with the traces 79A, 79B, 71-73 in the first layer. FIG. 6C is an illustration of a top view of selected components forming the shielding network of traces in a suspension shown in FIG. 6B. The network is formed by periodically having connecting traces 76 that extend perpendicularly across the suspension. The connecting traces 76 and traces 75A, 75B form a net of conducting material electrically connected to the common return signal and the stainless steel, which together act like the outer conductive shield of a coaxial cable to provide shielding for the signal carrying traces.

Figure 7:
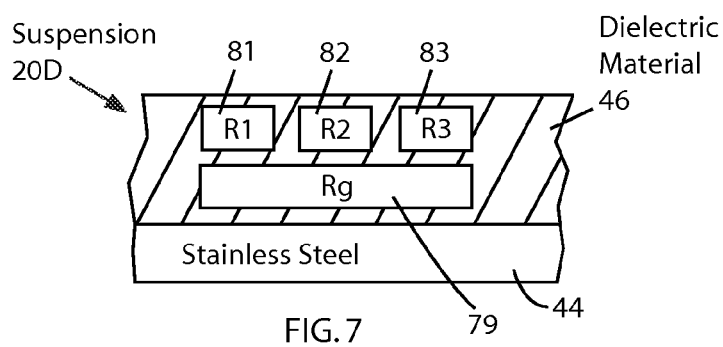
FIG. 7 is an illustration of a section view of selected components of a suspension according to an embodiment of the invention with dual layer traces for multiple readers and a common lead according to an embodiment of the invention.

FIG. 7 is an illustration of a section view of selected components of a suspension 20D according to an embodiment of the invention with dual layer traces for three read heads and a single common lead Rg 79 according to an embodiment of the invention. The view is at a point in the suspension between slider connection pads and the tail termination pads. In this embodiment the CL design allows for a reduction of leads in a 3R system, from 6 to 4 leads. The three dedicated conductive traces 81-83 for readers R1, R2 and R3 are shown in a first layer of the suspension and the trace for the common lead Rg 79 is formed in a second layer. The conductive material in the first and second layers is separated by dielectric material, which is not shown. The common lead Rg 79 is also separated from the traces and from the stainless steel layer 44 by dielectric material 46.

The invention claimed is:

1. A disk drive comprising:
 a slider with a plurality of read transducers that are each connected to a common return signal lead;
 a suspension with a set of electrically conductive signal traces that include a common return signal trace connected to the common return signal lead on the slider that is connected to all of the plurality of read transducers and a plurality of dedicated signal traces with each of the dedicated signal traces being connected to a corresponding read transducer; and
 a preamplifier connected to the set of signal traces on the suspension, the preamplifier having a plurality of amplifiers with each amplifier having an input from a corresponding one of the read transducers through the corresponding dedicated signal trace and being connected to the common return signal trace, the preamplifiers having a plurality of isolated amplifiers with isolated voltage bias sources with each amplifier being connected to a corresponding one of the isolated voltage bias sources, the preamplifier having a plurality of power supply isolation elements with each amplifier being connected to a first power supply voltage source through a corresponding first power supply isolation element and being connected to a second power supply voltage source through a corresponding second power supply isolation element.

2. The disk drive of claim 1 wherein each amplifier supplies a bias current for the corresponding one of the plurality of read transducers through the corresponding dedicated signal trace.

3. The disk drive of claim 1 wherein each of the plurality of power supply isolation elements are resistors with a resistance between 10 to 1000 ohms.

4. The disk drive of claim 1 wherein the plurality of read transducers includes at least two read transducers in the slider and the set of signal traces on the suspension are arranged in a first layer with at least two selected traces being connected to the common return signal lead.

5. The disk drive of claim 4 wherein the two selected traces connected to the common return signal lead are arranged with one of the dedicated signal traces connected to one of the at least two read transducers being disposed between the two selected traces.

6. The disk drive of claim 1 wherein the slider includes at least three read transducers and the set of signal traces on the suspension includes first, second and third dedicated signal traces, and wherein the first, second and third signal traces are arranged in a first layer and the first common return signal trace connected to the common return signal lead is positioned in a second layer under the first layer and wherein the first common return signal trace connected to the common return signal lead is at least as wide as the first, second and third signal traces combined.

7. The disk drive of claim 6 wherein the suspension includes a shielding network of conductive material in a second layer disposed above the first layer containing the first, second and third dedicated signal traces, two traces connected to the common return signal lead and wherein the shielding network of conductive material in the second layer is connected to the first and second common lead traces through vias that are filled with electrically conductive material and extend through dielectric material separating the first and second layers.

8. The disk drive of claim 1 wherein each amplifier is a differential isolated amplifier.

9. The disk drive of claim 8 wherein each amplifier includes first and second transistors with a base of the first transistor being connected to a first polarity of the corresponding isolated voltage bias source and a base of the second transistor being connected to a second polarity of the corresponding isolated voltage bias source.

10. The disk drive of claim 1 wherein each amplifier generates a differential output signal.

11. The disk drive of claim 10 wherein the isolated voltage bias sources and the plurality of power supply isolation elements substantially reduces crosstalk of signal and noise between each pair of amplifiers.

12. The disk drive of claim 1 wherein each amplifier includes first and second transistors with a collector of the first transistor and a collector of the second transistor supplying a differential output signal.

13. The disk drive of claim 1 wherein the preamplifier and the plurality of power supply isolation elements are mounted on a movable actuator and first and second power supply voltage sources are supplied through a flex cable that has a first end attached to the movable actuator and a second end connected to system electronics that are rigidly attached in the disk drive.

* * * * *